United States Patent Office 3,540,889
Patented Nov. 17, 1970

3,540,889
COFFEE FLAVOR ENHANCER
William P. Clinton, Monsey, and Floyd E. Pettit, Jr., White Plains, N.Y., assignors to General Foods Corporation, White Plains, N.Y., a corporation of Delaware
No Drawing. Filed Jan. 17, 1968, Ser. No. 698,380
Int. Cl. A23f 1/08
U.S. Cl. 99—71                    9 Claims

ABSTRACT OF THE DISCLOSURE

The flavor of soluble coffee is improved in the direction of freshly roasted and ground coffee by addition of a small but effective amount of methyl mercaptan to an aqueous extract of soluble coffee solids prior to drying the extract to a stable moisture content.

BACKGROUND OF THE INVENTION

This invention relates to enhancing the flavor of soluble coffee by addition of a known compound to the coffee percolate prior to drying.

The art of aromatizing soluble coffee by direct addition of volatile aromas to the dry coffee itself (via plating with coffee oil) as well as indirect addition of volatile aromatics to the soluble coffee extract prior to co-drying the aromas and extract have not met with great success. Plating causes flavor stability problems, spray-drying of aromatized extract allows important volatiles to evaporate or "flash-off" and generally unbalances the coffee flavor while freeze-drying the aromatized extract is very expensive. Moreover, even freeze-dried soluble coffee while having improved retention of volatiles does not taste exactly like freshly roasted and ground coffee and is found to contain some unbalanced flavor notes.

In lieu of the above, it has long been desired to find a simple method for enhancing coffee flavor which would include addition of one or more known compounds to either the dry soluble coffee itself or to the liquid coffee percolate prior to the drying step. This invention relates to the latter technique of simple addition of such a compound to the extract and then drying said extract.

SUMMARY OF THE INVENTION

This invention is founded on the discovery that the flavor of soluble coffee can be enhanced by simple addition of a small but effective amount of methyl mercaptan to the aqueous coffee percolate (obtained from a conventional extraction train) prior to drying. The drying method is not critical as long as some form of heat is applied in removal of the water from the extract and can include conventional spray-drying (at air temperatures of 500° F. or above), low temperature spray-drying techniques (at air temperatures below 500° F.), as well as freeze-drying techniques under vacuum or atmospheric conditions.

DETAILED DESCRIPTION OF THE INVENTION

Methyl mercaptan ($CH_3SH$) is a known compound, the synthesis of which is described in the chemical literature and which is readily available commercially.

The level of methyl mercaptan which is added to the coffee extract can vary between $5 \times 10^{-4}$ and $1 \times 10^{-9}$ parts of methyl mercaptan by weight of soluble coffee solids. At concentrations of less than $1 \times 10^{-9}$ parts, there is no noticeable enhancement of flavor upon drying the extract, while at concentrations of above $5 \times 10^{-4}$ parts, the methyl mercaptan's own flavor becomes noticeable and detracts from the enhancement.

A preferable level of methyl mercaptan has been found to be 1 to 500 parts per million (p.p.m.). When freeze-drying coffee extract, preferable level of methyl mercaptan has been found to be 1 to 30 p.p.m. When spray-drying said extract (at 500° F.) the level of methyl mercaptan is preferably increased to between 30 to 300 p.p.m. The level of methyl mercaptan can be lowered to 20 to 100 p.p.m. by lowering the spray-drying temperature of below 500° F., say 100° to 300° F. Also, higher levels of methyl mercaptan can be used in drying provided that the enhanced product is mixed with an appropriate amount of dry solids containing no methyl mercaptan to achieve the desired cup solids level.

Enhancement can be achieved by simple addition of the desired level in the coffee extract and then drying said extract by the application of heat. It may be preferred to add the desired level of mercaptan to a portion of extract, dry this enhanced portion, and then blend this dried extract with the dry solids containing no mercaptan. The methyl mercaptan can be added to the extract in the form of a dilute alcohol or water solution. Moreover, the heat applied during drying need not be excessive since conventional vacuum freeze-drying wherein the product temperature never exceeds 80° to 100° F. is capable of achieving good roasted coffee flavor in the final soluble coffee. Likewise, conventional spray-drying techniques wherein the atomized extract is exposed to temperatures as high as 500° to 600° F. or above for fractions of a second also attains enhancement. Finally, spray-drying the extract under low temperature drying conditions of between 100° to 300° F. also achieves an unexpected enhancement of roasted coffee flavor.

While the mechanism of the particular flavor development is not known, it is theorized that the methyl mercaptan chemically or physically reacts with organic chemical compounds naturally present within the soluble coffee solids in a time-temperature-solids concentration relationship to give an unexpected product in the direction of roasted coffee flavor upon drying of the extract. Unexpectedly, this reaction is not achieved when the methyl mercaptan is simply added to coffee which is not dried or heated, e.g., added directly to dried coffee solids or a cup of reconstituted coffee.

In addition to methyl mercaptan alone affecting flavor enhancement of roasted and ground coffee extract solids, methyl mercaptan also acts in combination with other compounds, such as diacetyl, to effect a desirable flavor change.

PREFERRED EMBODIMENTS OF THE INVENTION

This invention will now be described by reference to several specific examples which are believed to more clearly describe this invention.

Example 1

Coffee percolate having an extract concentration of 30% soluble solids was obtained from a series of percolation columns in the conventional manner. Methyl mercaptain was then added to this extract to give 3 p.p.m. (parts per million) of methyl mercaptan on a soluble solids basis. The aromatized extract was then fed to a co-current spray-drying tower having a 12′ diameter, a drying zone of about 18′ in height and an overall tower height of about 45′. The coffee was atomized under suitable pressure conditions to a maximum particle size of between 250 and 300 microns. Inlet temperature was between 500° and 550° F., outlet temperature was 240° to 255° F., and the particles had a residence time of between 10 to 20 seconds before the heated air exited from the dryer. The dried coffee had a moisture content of about 3% and a density of 0.25 g./cc.

The enhanced soluble coffee reconstituted to give an "instant" coffee which was difficult to distinguish from a control sample prepared in the same manner which did not contain methyl mercaptan. However, when the level of methyl mercaptan was increased to 40 p.p.m. on a soluble solids basis (and the extract dried) a distinct improvement in the direction of a freshly roasted coffee flavor preferred by many individuals was perceived. This roasted coffee flavor note was more evident as the level of mercaptan compound was increased to 66 p.p.m. (soluble solids basis). At 132 p.p.m., the enhancement was even more evident, and still desirable At levels of above 300 p.p.m., on a soluble solids basis, sulfide note giving an off-taste to the coffee were noted. However, the coffee solids containing 300 p.p.m. methyl mercaptan were then mixed with coffee solids which contained no mercaptan to thereby lower the level of methyl mercaptan on a cup solids basis to the 40–66 p.p.m. level. This gave a desirable flavor enhancement in the reconstituted cup.

Example 2

The coffee percolate of Example 1 (with 3 p.p.m. methyl mercaptan added on a soluble solids basis) was spray-dried under more gentle drying conditions. Chamber dimensions were 3' in diameter and drying height was 4'. The coffee extract was fed to an atomizing bowl having a downwardly directed liquid feed at a rate of 1.5 to 2.0 gallons per hour and was dried by air having an inlet temperature of 310° to 355° F. and an outlet temperature of 150° to 175° F. The drying air entered the chamber in a counter-current fashion and then reversed its direction and exited from the drying chamber in a co-current fashion along with the dried coffee powder.

Enhancement of this product when compared to a control sample (not having added methyl mercaptan) was not evident. Enhancement was not noted until levels of 20 p.p.m. were reached. However, at levels of 40 to 66 p.p.m. enhancement was more evident than in the Example 1 product at the same levels. Here also, at levels above 300 p.p.m., off-tastes in the reconstituted coffee were noted but were off-set by dry-blending the enhanced coffee with coffee solids which contained no mercaptan.

Example 3

The coffee percolate of Example 1 (with 3 p.p.m. of methyl cercaptan added on a soluble basis) was frozen to below its eutectic freezing point ($-13°$ F.), ground, and then vacuum freeze-dried in apparatus similar to that shown in Abbott et al. 3,132,930, at a pressure of below 200 microns to achieve a final moisture content of 2.5% while avoiding product temperatures in the dried extract which exceeded 100° F.

This product, when compared to a control freeze-dried without mercaptan, had desirable fresh roasted coffee flavor notes preferred by most people.

The level of methyl mercaptan was varied in this example between 3 p.p.m. and 9 p.p.m. to obtain a distinct and desirable enhancement in the direction of roasted coffee flavor notes. However, at levels of 30 p.p.m. a slight off-taste was perceived which was more evident at levels of 127 p.p.m. and 193 p.p.m. Here also, this could be off-set by dry-blending with coffee solids containing no mercaptan.

Example 4

Various levels of methyl mercaptan were added directly (without co-drying) to various reconstituted cups of coffee (including spray-dried soluble coffee, freeze-dried soluble coffee, and fresh percolate). In all cases, no enhancement of coffee flavor was detected but, on the contrary, an undesirable mercaptan or sulfide taste could be perceived. This was evident at the 10 p.p.m. level (solids basis) and increased in proportion to the level of mercaptan added. In no case was a desirable enhancement or improvement in coffee flavor noted.

While this invention has been described by reference to specific examples, it is understood to be limited only by the scope of the appended claims.

What is claimed is:

1. A method of imparting roasted coffee flavor to soluble coffee which comprises adding a small but effective amount of methyl mercaptan to an aqueous extract of roasted coffee solids and then drying said extract to a stable moisture content by application of heat during at least a portion of the water removal process.

2. The process of claim 1 wherein the methyl mercaptan is added to the extract at a level of between $5 \times 10^{-4}$ to $1 \times 10^{-9}$ parts of mercaptan for each part of soluble coffee solids (dry basis).

3. The process of claim 1 wherein the methyl mercaptan is added to the extract at a level of between 1 to 500 parts per million (p.p.m.) of mercaptan for each part of soluble coffee solids.

4. The process of claim 3 wherein the methyl mercaptan is added to the extract at a level of between 1 to 30 p.p.m. and the extract is freeze-dried under vacuum conditions of less than 500 microns.

5. The process of claim 3 wherein the methyl mercaptan is added to the extract at a level of 30 to 300 p.p.m. and the extract is spray-dried at air temperatures of above 500° F.

6. The process of claim 3 wherein the methyl mercaptan is added at a level of 20 to 100 p.p.m. and the extract is spray-dried at air temperatures of below 500° F.

7. The process of claim 4 wherein the extract is divided into two portions, the methyl mercaptan is added to only one portion of the extract, both portions are dried, and then dry-blended to achieve the desired level of mercaptan on a dry basis.

8. The process of claim 5 wherein the extract is divided into two portions, the methyl mercaptan is added to only one portion of the extract, both portions are dried, and then dry-blended to achieve the desired level of mercaptan on a dry basis.

9. The process of claim 6 wherein the extract is divided into two portions, the methyl mercaptan is added to only one portion of the extract, both portions are dried, and then dry-blended to achieve the desired level of mercaptan on a dry basis.

References Cited

UNITED STATES PATENTS

| 2,826,504 | 3/1958 | Chase | 99—71 |
| 2,947,634 | 8/1960 | Feldman | 99—71 |

FOREIGN PATENTS

| 260,960 | 2/1928 | Great Britain. |
| 572,026 | 3/1959 | Canada. |
| 832,299 | 4/1960 | Great Britain. |

OTHER REFERENCES

Food Processing & Pkg., May 1950, pp. 176–179.

TIM R. MILES, Primary Examiner

R. HALPER, Assistant Examiner